(12) United States Patent
Pawliczek et al.

(10) Patent No.: US 12,503,230 B2
(45) Date of Patent: Dec. 23, 2025

(54) AIRCRAFT OVERHEAD PASSENGER SERVICE UNIT, AIRCRAFT, AND METHOD OF ILLUMINATING A PASSENGER CABIN OF AN AIRCRAFT

(71) Applicant: Goodrich Lighting Systems GmbH & Co. KG, Lippstadt (DE)

(72) Inventors: Carsten Pawliczek, Lippstadt (DE); Andre Hessling-von Heimendahl, Koblenz (DE); Björn Schallenberg, Geseke (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/781,470

(22) Filed: Jul. 23, 2024

(65) Prior Publication Data
US 2025/0042547 A1    Feb. 6, 2025

(30) Foreign Application Priority Data
Aug. 4, 2023   (EP) .................................... 23189728

(51) Int. Cl.
*B64D 11/00* (2006.01)
*B64D 45/00* (2006.01)

(52) U.S. Cl.
CPC ...... *B64D 11/00* (2013.01); *B64D 2011/0038* (2013.01); *B64D 2045/007* (2013.01)

(58) Field of Classification Search
CPC ...... B64D 2011/0038; B64D 2045/007; B60Q 3/41; B60Q 3/43; G09F 2013/05; G09F 13/0436
See application file for complete search history.

(56) References Cited

U.S. PATENT DOCUMENTS 2,250,954 A * 7/1941 Hagerty ............... B60Q 3/43
362/479
9,227,727 B2   1/2016 Nisimura et al.
(Continued)

FOREIGN PATENT DOCUMENTS

DE    29517500    2/1997

OTHER PUBLICATIONS

EPO, Extended European Search Report dated Jan. 9, 2024 in EP Serial No. 23189728.1.

*Primary Examiner* — Alexander K Garlen
(74) *Attorney, Agent, or Firm* — SNELL & WILMER L.L.P.

(57) ABSTRACT

An aircraft overhead passenger service unit, which is configured to be mounted in a passenger cabin of an aircraft above a passenger seating space, comprises a visual sign structure extending downward from the aircraft overhead passenger service unit. The visual sign structure comprises a signal light and a wall illumination light. The signal light is arranged on a first side of the visual sign structure facing rearward. The signal light comprises at least one first switchable light source. The wall illumination light is arranged on a second side of the visual sign structure facing forward. The wall illumination light comprises at least one second switchable light source and a light directing element. The at least one second switchable light source and the light directing element are arranged to provide a wall illumination light output towards a lateral side of the aircraft overhead passenger service unit.

15 Claims, 6 Drawing Sheets

(56) References Cited

U.S. PATENT DOCUMENTS

| | | |
|---|---|---|
| 9,789,962 B2 | 10/2017 | Ehlers et al. |
| 2003/0160706 A1 | 8/2003 | Endress et al. |
| 2013/0208490 A1* | 8/2013 | Savian ................. B60Q 3/43 362/471 |
| 2014/0169012 A1* | 6/2014 | Ehlers .................. B64D 11/00 362/470 |
| 2014/0267975 A1* | 9/2014 | Ying ..................... G09F 21/04 362/520 |
| 2015/0090839 A1* | 4/2015 | Freund ................. B64D 13/00 244/118.5 |
| 2015/0166178 A1* | 6/2015 | Savian ............... B64D 11/0015 244/118.6 |
| 2017/0137129 A1* | 5/2017 | Hessling-Von Heimendahl ......... B64D 13/00 |
| 2019/0018429 A1 | 1/2019 | Albrecht et al. |
| 2020/0043307 A1* | 2/2020 | Lapujade ............... G08B 7/062 |
| 2020/0361608 A1* | 11/2020 | Depta ................ B64D 11/0648 |
| 2021/0061168 A1* | 3/2021 | Camp .................. B64D 47/02 |

\* cited by examiner

AIRCRAFT OVERHEAD PASSENGER SERVICE UNIT, AIRCRAFT, AND METHOD OF ILLUMINATING A PASSENGER CABIN OF AN AIRCRAFT

CROSS-REFERENCE TO RELATED APPLICATIONS

This application claims priority to EP patent application Ser. No. 23/189,728.1, filed Aug. 4, 2023 and titled "AIRCRAFT OVERHEAD PASSENGER SERVICE UNIT, AIRCRAFT, AND METHOD OF ILLUMINATING A PASSENGER CABIN OF AN AIRCRAFT," which is incorporated by reference herein in its entirety for all purposes.

FIELD

The present invention is in the field of aircraft overhead passenger service units, which are to be installed in passenger cabins of aircraft. The present invention is in particular related to aircraft overhead passenger service units that provide signaling information to the passenger that are seated in the passenger cabin.

BACKGROUND

Passenger aircraft, such as commercial airplanes, comprising a passenger cabin with passenger seats, are usually equipped with passenger cabin lights for illuminating the passenger cabin.

Conventional passenger cabin lights for illuminating the passenger cabin are not always satisfactory. In particular, they often add a considerable amount of weight to the aircraft and often need a large amount of electric power for illuminating the passenger cabin.

It would therefore be beneficial to provide an illumination device for a passenger cabin of an aircraft and a method of illuminating the passenger cabin that allow for illuminating the passenger cabin with a higher energy efficiency and/or with a lower amount of added weight.

SUMMARY

Exemplary embodiments of the invention include an aircraft overhead passenger service unit, which is configured to be mounted in a passenger cabin of an aircraft above a passenger seating space. Passenger seats may be installed within the passenger seating space and passengers may be seated in the passenger seating space/in the passenger seats during operation of the aircraft.

When the aircraft overhead passenger service unit is mounted within the passenger cabin of an aircraft, a lower surface of the aircraft overhead passenger service unit faces the passenger seats/passengers. The lower surface may extend substantially horizontally. In particular, the lower surface may extend in a plane spanned by a longitudinal direction of the aircraft overhead passenger service unit and by a transverse direction of the aircraft overhead passenger service unit, which is oriented orthogonal to the longitudinal direction. The longitudinal direction of the aircraft overhead passenger service unit may in particular extend substantially along the longitudinal direction of the passenger cabin of the aircraft. Further, the longitudinal direction of the aircraft overhead passenger service unit may in particular be substantially aligned with the flight direction of the aircraft. The lower surface of the aircraft overhead passenger service unit may provide a main passenger interface surface of the aircraft overhead passenger service unit.

The aircraft overhead passenger service unit comprises a visual sign structure extending downward from the aircraft overhead passenger service unit. The visual sign structure may in particular extend downward from the lower surface of the aircraft overhead passenger service unit.

The visual sign structure comprises a signal light and a wall illumination light.

The signal light is arranged on a first side of the visual sign structure facing rearward with respect to the flight direction of the aircraft. The signal light comprises at least one first switchable light source.

The wall illumination light is arranged on a second side of the visual sign structure facing forward with respect to the flight direction of the aircraft. The wall illumination light comprises at least one second switchable light source and a light directing element. The at least one second switchable light source and the light directing element are arranged to provide a wall illumination light output towards a lateral side of the aircraft overhead passenger service unit. The at least one second switchable light source of the wall illumination light is switchable independently of the at least one first switchable light source of the signal light.

Exemplary embodiments of the invention also include a method of illuminating a passenger cabin of an aircraft from a visual sign structure that extends downward from an aircraft overhead passenger service unit, which is mounted to a passenger overhead portion of the passenger cabin. The method comprises selectively providing a signal light output from a first side of the visual sign structure that faces rearward; and selectively providing a wall illumination light output towards a lateral side of the aircraft overhead passenger service unit from a second side of the visual sign structure that faces forward. The wall illumination light output may in particular be directed towards a side wall of the passenger cabin. In the following, a side wall of the passenger cabin is also referred to as a "cabin wall".

In exemplary embodiments of the invention, emitting the wall illumination light output towards a lateral side of the aircraft overhead passenger service unit does not necessarily require that the wall illumination light output needs to be emitted exactly laterally, in particular orthogonal, with respect to the longitudinal direction of the aircraft overhead passenger service unit. Emitting the wall illumination light output towards a lateral side of the aircraft overhead passenger service unit may in particular include set-ups where the wall illumination light output is emitted towards a portion of a cabin wall of an aircraft for illuminating said portion of said cabin wall.

An aircraft overhead passenger service unit and a method of illuminating a passenger cabin of an aircraft with a visual sign structure according to exemplary embodiments of the invention allow for illuminating at least one portion of a cabin wall, without providing an additional, dedicated illumination device. Instead, an aircraft overhead passenger service unit, and in particular a visual sign structure already comprised in the aircraft overhead passenger service unit, are employed for illuminating the at least one portion of the cabin wall. As compared to previous approaches, where dedicated illumination devices were used for illuminating the cabin wall, the passenger cabin may be illuminated with a higher energy efficiency, at lower costs, and with a lower amount of weight added to the aircraft.

In an embodiment, the at least one first switchable light source and/or the at least one second switchable light source are LEDs. In particular, the at least one first switchable light source may be at least one first switchable LED and/or the at least one second switchable light source may be at least one second switchable LED. LEDs are energy-efficient light sources that have a long lifetime and may be provided at low costs.

In an embodiment, the signal light comprises an at least partially light transmissive screen, which is arranged over the at least one first switchable light source. The at least partially light transmissive screen may be configured to convey signaling information when it is back-lit by the at least one first switchable light source. Said signaling information may in particular include at least one signaling symbol and/or at least one alphanumeric message.

In an embodiment, the at least partially light transmissive screen includes at least one cut-out portion, which allows light, emitted by the at least one first switchable light source, to pass through the at least partially light transmissive screen. The at least one cut-out portion may have the shape of at least one symbol and/or of at least one alphanumeric message, which symbol(s)/alphanumeric message(s) may be lit up for signaling information to the passengers of the aircraft.

In an embodiment, the at least partially light transmissive screen includes light transmissive portions having different colors, i.e. light transmissive portions, which allow light having different colors to pass through. The at least partially light transmissive screen may also include portions having different degrees of transparency, resulting in darker and brighter portions of the at least partially light transmissive screen, when it is back-lit by the at least one first switchable light source. Such selective color filtering and/or selective brightness filtering is also an effective and convenient way of conveying signaling information.

In an embodiment, the at least one first switchable light source is a plurality of first switchable light sources and/or the at least one switchable second light source is a plurality of second switchable light sources.

The plurality of first switchable light sources may comprise a plurality of identical light sources/light sources of the same type. Alternatively, the plurality of first switchable light sources may comprise different types of light sources, in particular light sources emitting light having different intensities and/or light having different colors.

The plurality of second switchable light sources may comprise a plurality of identical light sources/light sources of the same type. Alternatively, the plurality of second switchable light sources may comprise different types of light sources, in particular light sources emitting light having different intensities and/or light having different colors.

Embodiments comprising different types of light sources may emit different light outputs, in particular light outputs having different intensities and/or different colors, by selectively activating different types of light sources.

In an embodiment comprising a plurality of first switchable light sources, the plurality of first switchable light sources may be switchable collectively. Switching the plurality of first switchable light sources collectively may allow for a simple and easy control of the plurality of first switchable light sources.

In an embodiment, the plurality of first switchable light sources may be switchable independently of each other. This may allow for varying the illumination of the at least partially light transmissive screen from behind. The plurality of first switchable light sources may in particular be arranged for illuminating different portions of the at least partially light transmissive screen. Different signaling symbols and/or different alphanumeric characters may be formed in the different portions of the at least partially light transmissive screen. This may allow for displaying different signaling symbols and/or different alphanumeric messages on the at least partially light transmissive screen by selectively activating different first switchable light sources.

The plurality of first switchable light sources may also include several groups of first switchable light sources. All first switchable light sources in each group of first switchable light sources may be collectively switchable, and the individual groups of first switchable light sources may be switchable independently of each other.

In an embodiment comprising a plurality of second switchable light sources, the plurality of second switchable light sources may be switchable collectively. Switching the plurality of second switchable light sources collectively may allow for a simple and easy control of the plurality of second switchable light sources.

In an embodiment, the plurality of second switchable light sources may be switchable independently of each other. This may allow for varying the illumination of the cabin wall. The plurality of second switchable light sources may include second switchable light sources emitting light having different intensities and/or different colors. Individually switching the plurality of second switchable light sources may allow for varying the intensity and/or the color of the illumination of the cabin wall, as provided by the wall illumination light.

The plurality of second switchable light sources may also include several groups of second switchable light sources. All second switchable light sources in each group may be collectively switchable, and the individual groups of second switchable light sources may be switchable independently of each other, in order to allow for varying the intensity and/or the color of the illumination of the cabin wall.

In an embodiment, the wall illumination light output has a maximum light intensity and a horizontal opening angle. The horizontal opening angle may be defined as the angular range in which the intensity of the wall illumination light output is at least 10% of the maximum light intensity of the the wall illumination light output. When projected onto a plane, which extends in the longitudinal direction of the aircraft overhead passenger service unit and in the transverse direction of the aircraft overhead passenger service unit, which is oriented orthogonal to the longitudinal direction, the horizontal opening angle may be in a range of between 90° and 180°, in particular in a range of between 120° and 150°, around the transverse direction.

In an embodiment, the wall illumination light output, when projected onto a vertical plane extending in the transverse direction, which is oriented orthogonal to the longitudinal direction of the aircraft overhead passenger service unit, has a vertical opening angle in a range of between 20° and 70°, in particular in a range of between 30° to 60°.

In an embodiment, the visual sign structure comprises a common support that supports both the at least one first switchable light source and the at least one second switchable light source. Employing a common support for supporting the at least one first switchable light source and the at least one second switchable light source may allow for reducing the number of components of the visual sign structure. This may allow for simplifying the complexity of the visual sign structure and for reducing the weight of the visual sign structure.

In an embodiment, the common support extends straight down from the aircraft overhead passenger service unit. The common support may in particular extend substantially orthogonal to the lower surface of the aircraft overhead passenger service unit. The common support May further be oriented substantially orthogonal to the longitudinal direction of the aircraft overhead passenger service unit.

In an embodiment, the at least one second switchable light source may face in a forward direction, in particular in a flight direction of the aircraft, and the at least one first light source may face rearward towards a passenger in a passenger direction, which is in particular oriented opposite to the flight direction.

In an embodiment, the at least one first switchable light source and the at least one second switchable light source are arranged on opposite sides of the common support. The at least one first switchable light source may in particular be arranged on a rear side of the common support, facing in a rearward direction of the aircraft towards passengers sitting below and behind the aircraft overhead passenger service unit, and the at least one second switchable light source may be arranged on a front side of the visual sign, facing away from the passengers in a forward direction of the aircraft.

In an embodiment, the common support comprises a circuit board, in particular a printed circuit board. The at least one first switchable light source may be arranged on a first side of the circuit board and the at least one second switchable light source may be arranged on a second side of the circuit board. The circuit board may comprise electric paths for supplying electric power to the at least one first switchable light source and to the at least one second switchable light source, i.e. to the first side of the circuit board and to the second side of the circuit board.

In an embodiment, the light directing element of the wall illumination light includes at least one light scattering element for scattering light, emitted by the at least one second light source. The at least one light scattering element may be provided, in order to provide a diffuse wall illumination light output of the wall illumination light/in order to provide for a highly uniform illumination of the cabin wall. The light scattering element may in particular include a light transmissive plate, which may be corrugated/undulated on at least one surface, i.e. on at least one of the inner surface and the outer surface, for scattering the light.

The light scattering element may be made of light transmissive synthetic material, The light scattering element may in particular be made of polymethyl methacrylate (PMMA), polycarbonate (PC), glass, or other suitable materials.

In an embodiment, the light directing element includes at least one light reflective element for reflecting light, which is emitted by the at least one second light source, into lateral directions.

In an embodiment, the at least one second switchable light source and the light directing element are configured to provide a single wall illumination light output towards a single lateral side of the aircraft overhead passenger service unit. The single wall illumination light output may in particular be directed predominantly towards the single lateral side. While the single wall illumination light output is directed predominantly towards a single lateral side, this does not exclude that some stray light is additionally emitted in other directions. In an embodiment, the emission of light in other directions than the single lateral side may be less than 10% of the total amount of the light emitted by the at least one second switchable light source.

In an embodiment, the wall illumination light comprises a light directing element, which has two different possible mounting orientations. In such an embodiment, the light directing element may be mounted to the wall illumination light in two different orientations. Each of the two possible mounting orientations may be associated with a respective single lateral side, to which the single wall illumination light output is directed when the light directing element is mounted in the respective mounting orientation.

Such a light directing element may allow for conveniently switching the side, to which the single wall illumination light output is directed, by changing the mounting orientation of the light directing element. In consequence, the same wall illumination light may be employed for selectively emitting a single wall illumination light output towards one of two different potential lateral sides. As a result, it is not necessary to provide two different types of aircraft overhead passenger service units for selectively illuminating the left sidewall and the right sidewall of the passenger cabin, and the costs for manufacturing the aircraft overhead passenger service units and the assembly complexity may be kept particularly low.

In an embodiment, the at least one second switchable light source and the light directing element of the wall illumination light are configured to provide two wall illumination light outputs towards two lateral sides of the aircraft overhead passenger service unit. The two wall illumination light outputs may be directed predominantly towards two different lateral sides, in particular towards two opposing lateral sides. The two opposing lateral sides may in particular be oriented at an angle of 180° with respect to each other. The two wall illumination light outputs may be substantially symmetric with respect to the longitudinal direction of the aircraft overhead passenger service unit. It is also possible that the two wall illumination light outputs are not symmetric with respect to the longitudinal directions. They may for example be directed towards different portions of the passenger cabin, such as wall portions at different heights of the passenger cabin. A configuration with two wall illumination light outputs towards two lateral sides of the aircraft overhead passenger service unit may allow for illuminating two portions of the passenger cabin, which are arranged on opposite lateral sides, with a single wall illumination light. As a result, the number of wall illumination lights, employed for illuminating the passenger cabin, may be considerably reduced.

Exemplary embodiments of the invention also include an aircraft, such as an airplane or a helicopter, comprising a passenger cabin and at least one aircraft overhead passenger service unit according to an exemplary embodiment of the invention. In such an aircraft, the at least one aircraft overhead passenger service unit may be mounted to a passenger overhead portion of the passenger cabin, with at least one wall illumination light output of the wall illumination light being directed towards at least one cabin wall.

In an embodiment, the at least one aircraft overhead passenger service unit is a plurality of aircraft overhead passenger service units. In other words, in such an embodiment, the aircraft comprises a plurality of aircraft overhead passenger service units according to exemplary embodiments of the invention. The plurality of aircraft overhead passenger service units may be arranged in one or more row arrangements extending along one or more passenger supply channels in the passenger overhead portion of the passenger cabin. The plurality of aircraft overhead passenger service units may cooperate to provide signaling information to passengers of the aircraft, when seated in a plurality of seating rows, and may cooperate to provide an extended illumination of the passenger cabin, in particular a continuous illumination of one or more cabin walls. The additional features, modifications and effects, which were described before with respect to exemplary embodiments of an aircraft overhead passenger service unit, also apply to the aircraft comprising at least one aircraft overhead passenger service unit according to an exemplary embodiment of the invention in an analogous manner.

BRIEF DESCRIPTION OF THE DRAWINGS

Further exemplary embodiments of the invention are described below with respect to the accompanying drawings, wherein.

DETAILED DESCRIPTION

Figure 1:
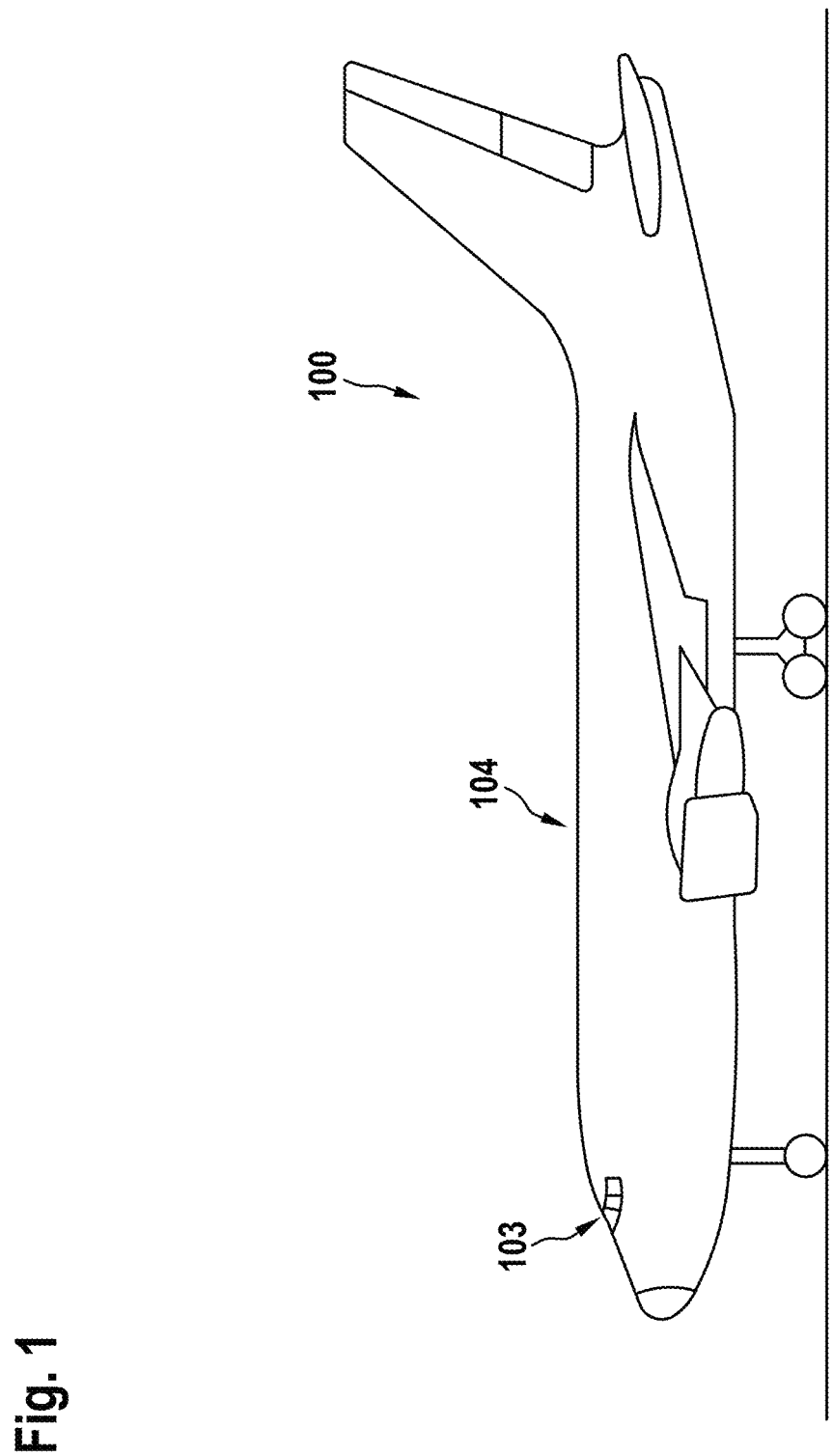
FIG. 1 depicts a schematic side view of an aircraft in accordance with an exemplary embodiment of the invention.

FIG. 1 depicts a schematic side view of an aircraft 100, in particular of an airplane, in accordance with an exemplary embodiment of the invention. In the exemplary embodiment shown in FIG. 1, the aircraft 100 is a large passenger airplane, comprising a cockpit 103 and a passenger cabin 104. The aircraft 100 may be a commercial passenger airplane, a private airplane, or a military aircraft. The air-craft 100 is equipped with at least one aircraft overhead passenger service unit in accordance with an exemplary embodiment of the invention. It is also possible that an aircraft overhead passenger service unit according to an exemplary embodiment of the invention is employed in a rotorcraft, such as a helicopter.

Figure 2:
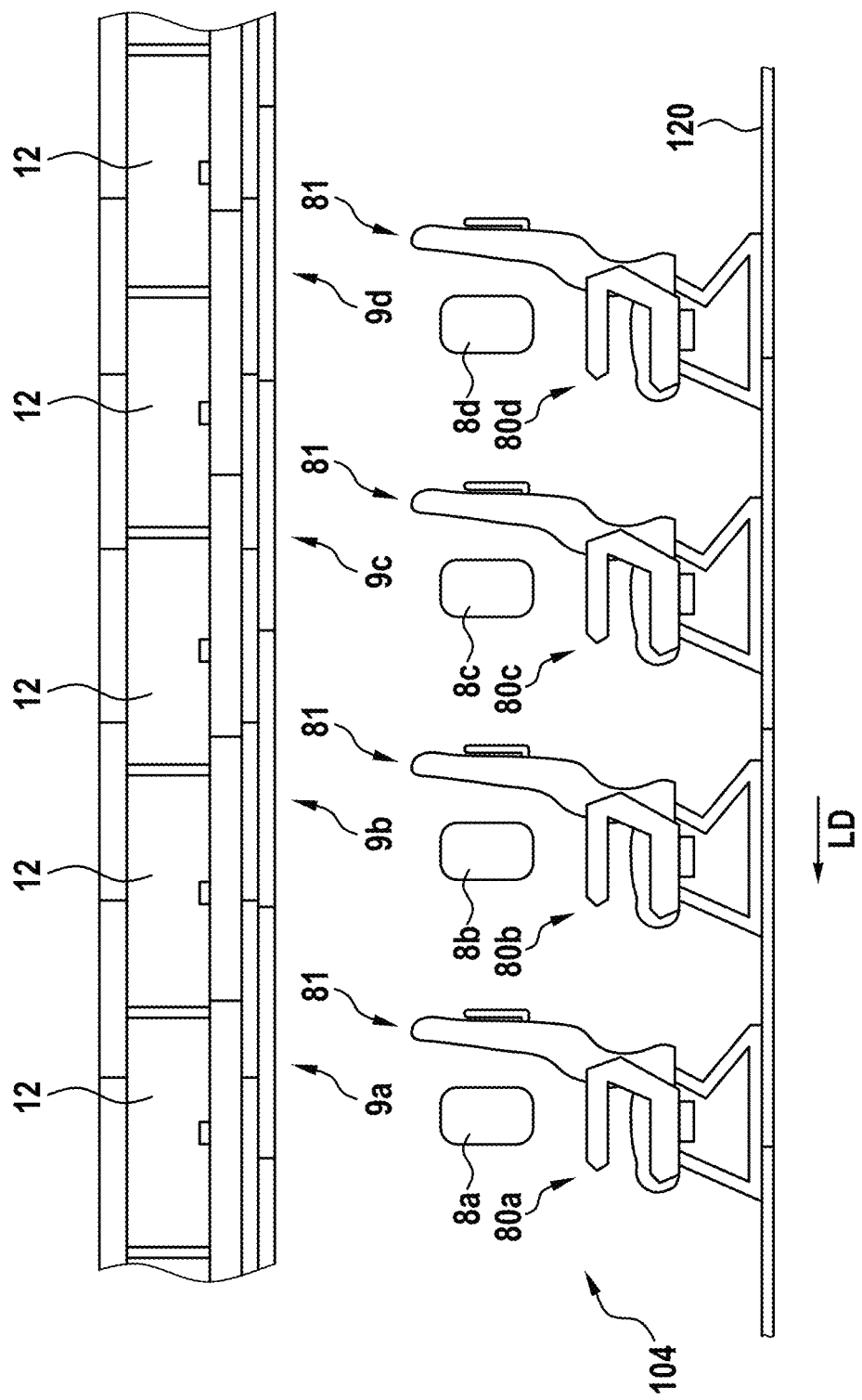
FIG. 2 depicts a schematic longitudinal cross-sectional view of a section of a passenger cabin of the aircraft depicted in FIG. 1.

FIG. 2 shows a schematic longitudinal cross-sectional view of a section of the passenger cabin 104 of the aircraft 100 of FIG. 1.

Four seats 81, which are in the following referred to as passenger seats 81, are visible in FIG. 2. The passenger seats 81 are mounted to the floor 120 of the passenger cabin 104. Each of the depicted passenger seats 81 belongs to a different seat row 80a-80d. The seat rows 80a-80d are spaced apart from each other along the longitudinal direction LD of the passenger cabin 104. The longitudinal direction LD of the passenger cabin 104 basically corresponds to the forward flight direction of the aircraft 100.

For each of the seat rows 80a-80d, a window 8a-8d is provided, which allows the passengers to view the outside of the aircraft 100. Further, a plurality of overhead baggage compartments 12, which provide storage space for the passengers' baggage, are provided above the passenger seats 81.

Each seat row 80a-80d may include a plurality of passenger seats, for example three passenger seats, which are arranged next to each other. The additional passenger seats of each seat row 80a-80d, in particular a window seat and a middle seat, are not visible in FIG. 2, as they are arranged behind and therefore hidden by the depicted passenger seats 81, which are aisle seats.

An aircraft overhead passenger service unit ("PSU") 9a-9d is provided above each of the seat rows 80a-80d, respectively. The aircraft overhead passenger service units 9a-9d may be embodied in accordance with exemplary embodiments of the invention.

Figure 3:
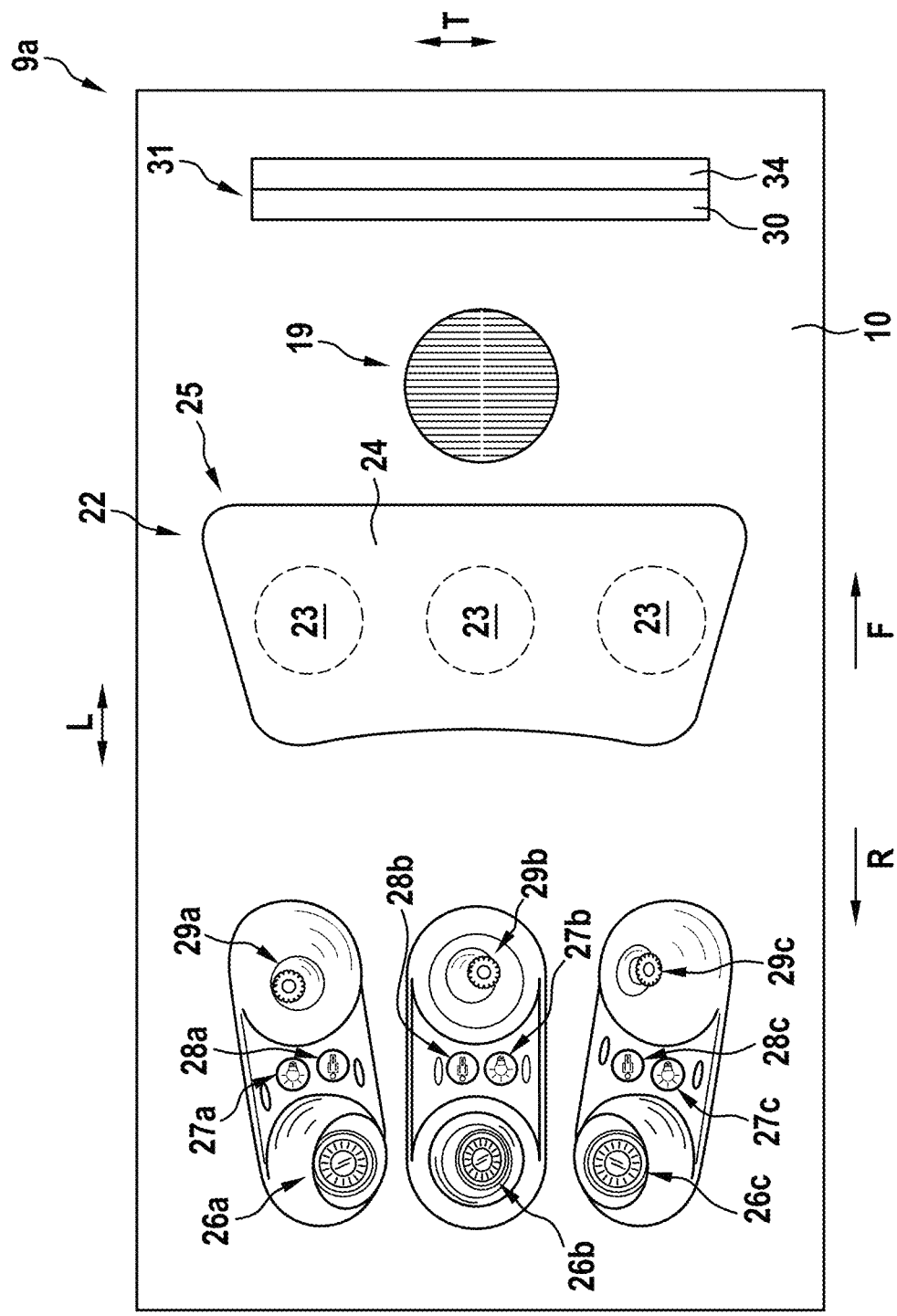
FIG. 3 depicts a schematic plan view of an aircraft overhead passenger service unit according to an exemplary embodiment of the invention.

FIG. 3 depicts a schematic plan view of an aircraft overhead passenger service unit 9a according to an exemplary embodiment of the invention. In particular, FIG. 3 depicts a lower surface 10 of the aircraft overhead passenger service unit 9a, with the lower surface 10 providing a main passenger interface surface. In FIG. 3, the lower surface 10 is depicted as it is seen from the position of a passenger sitting on one of the passenger seats 81 below the aircraft overhead passenger service unit 9a.

Figure 4:
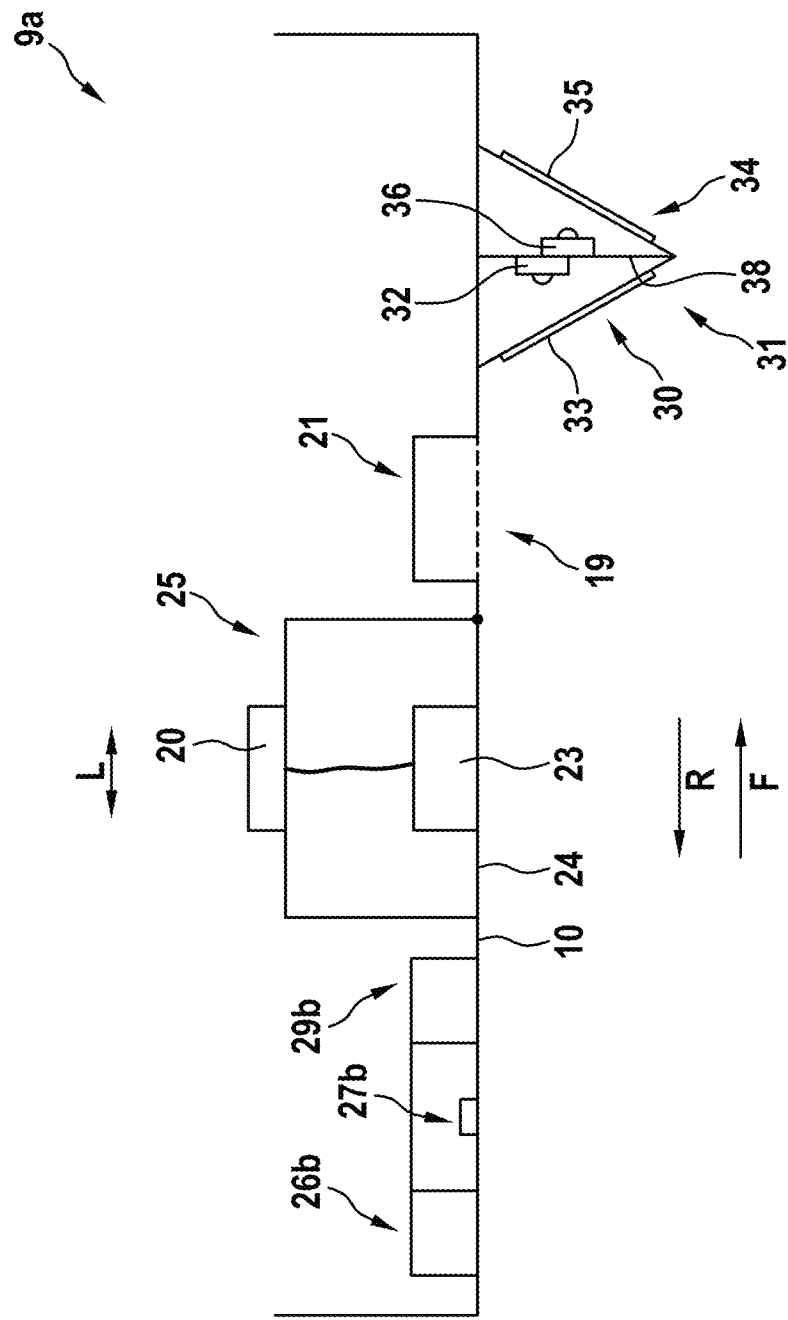
FIG. 4 depicts a schematic cross-sectional view of the overhead passenger service unit depicted in FIG. 3.

FIG. 4 depicts a schematic cross-sectional view of the aircraft overhead passenger service unit 9a depicted in FIG. 3. The cross-sectional view of FIG. 4 is orthogonal to the drawing plane of FIG. 3.

The aircraft overhead passenger service unit 9a extends in a longitudinal direction L, which is from left to right in FIGS. 3 and 4. When the aircraft overhead passenger service unit 9a is installed within the passenger cabin 104 of an aircraft 100, as it is depicted in FIG. 2, the lower surface 10 of the aircraft overhead passenger service unit 9a may extend substantially horizontally, and the longitudinal direction L of the aircraft overhead passenger service unit 9a may extend substantially along the longitudinal direction LD of the passenger cabin 104. On the side shown to the left in FIGS. 3 and 4, the aircraft overhead passenger service unit 9a comprises a row of three adjustable reading lights 26a-26c. The adjustable reading lights 26a-26c are arranged next to each other in the transverse direction T, which is oriented orthogonal to the longitudinal direction L of the aircraft overhead passenger service unit 9a.

Six electrical switches 27a-27c, 28a-28c are provided to the right of the reading lights 26a-26c, a respective pair of two switches 27a-27c, 28a-28c next to each of the reading lights 26a-26c. A first one of the switches 27a-27c of each pair is configured for switching the adjacent reading light 26a-26c, and the second switch 28a-28c of each pair is configured for triggering a signal for calling cabin service personnel.

A row of three adjacent gaspers 29a-29c is provided next to the switches 27a-27c, 28a-28c.

Adjacent to the gaspers 29a-29c, there is an oxygen mask storage portion 25 comprising a movable door 24, which covers an oxygen mask storage compartment 22. The oxygen mask storage compartment 22 houses at least three oxygen masks 23, which are coupled to an oxygen supply 20 (see FIG. 4), for example to an oxygen source such as a pressurized oxygen container or a chemical oxygen generator.

In an emergency situation, resulting in a loss of pressure within the passenger cabin 104, the movable door 24 will open and allow the oxygen masks 23 to drop out of the oxygen mask storage compartment 22. Each of the passengers sitting below the aircraft overhead passenger service unit 9a may grasp one of the oxygen masks 23. After being activated, the oxygen supply 20 may supply an oxygen rich gas to the oxygen masks 23, in order to allow the passengers to breathe almost normally, even in case of a pressure loss within the passenger cabin 104.

To the right side of the oxygen mask storage portion 25, a grid 19 is formed within the aircraft overhead passenger service unit 9a. A loudspeaker 21 (see FIG. 4), which may be used for delivering acoustic announcements to the passengers within the passenger cabin 104, is arranged behind said grid 19.

A visual sign structure 31 is provided on the right side of the grid 19. The visual sign structure 31 extends downward from the aircraft overhead passenger service unit 9a. In particular, the visual sign structure extends downward from the lower surface 10, which faces the passenger seats 81.

The visual sign structure 31 comprises a signal light 30, which is arranged on a first side of the visual sign structure 31, facing in a rearward direction R. When the aircraft overhead passenger service unit 9a is installed within the passenger cabin 104, the rearward direction R is oriented along the longitudinal direction LD of the passenger cabin 104 and points towards a rear end of the passenger cabin 104.

The signal light 30 is configured for selectively displaying signaling information to the passengers. The signaling information may include alphanumeric messages, such as "non smoking" or "fasten you seat belt", and/or signaling symbols that visualize the signaling information.

The signal light 30 comprises at least one first switchable light source 32 and an at least partially light transmissive screen 33. The at least one first switchable light source 32 may be at least one LED. The at least partially light transmissive screen 33 is arranged over the at least one first switchable light source 32 and is configured for displaying the signaling information, when back-lit by the at least one first switchable light source 32.

For displaying the signaling information, when back-lit by the at least one first switchable light source 32, the at least partially light transmissive screen 33 may include at least one cut-out portion, i.e. an opening formed within the at least partially light transmissive screen 33, which may allow light, emitted by the at least one first switchable light source 32, to pass through the at least partially light transmissive screen 33. The cut-out may have the shape of a desired alphanumeric message and/or the shape of one or more signaling symbols.

Alternatively or additionally, the at least partially light transmissive screen 33 may include light transmissive portions with differing light transmission characteristics. The light transmissive portions may in particular include light transmissive portions having different colors, which allow light of different colors to pass through, and/or portions having different degrees of transparency, which result in darker and brighter portions of the at least partially light transmissive screen 33, when it is back-lit by the at least one first switchable light source 32.

The visual sign structure 31 further comprises a wall illumination light 34. The wall illumination light 34 is arranged on a second side of the visual sign structure 31, facing in a forward direction F. When the aircraft overhead passenger service unit 9a is installed within the passenger cabin 104, the forward direction F is oriented along the longitudinal direction LD and points towards a front end of the passenger cabin 104.

Figure 7:
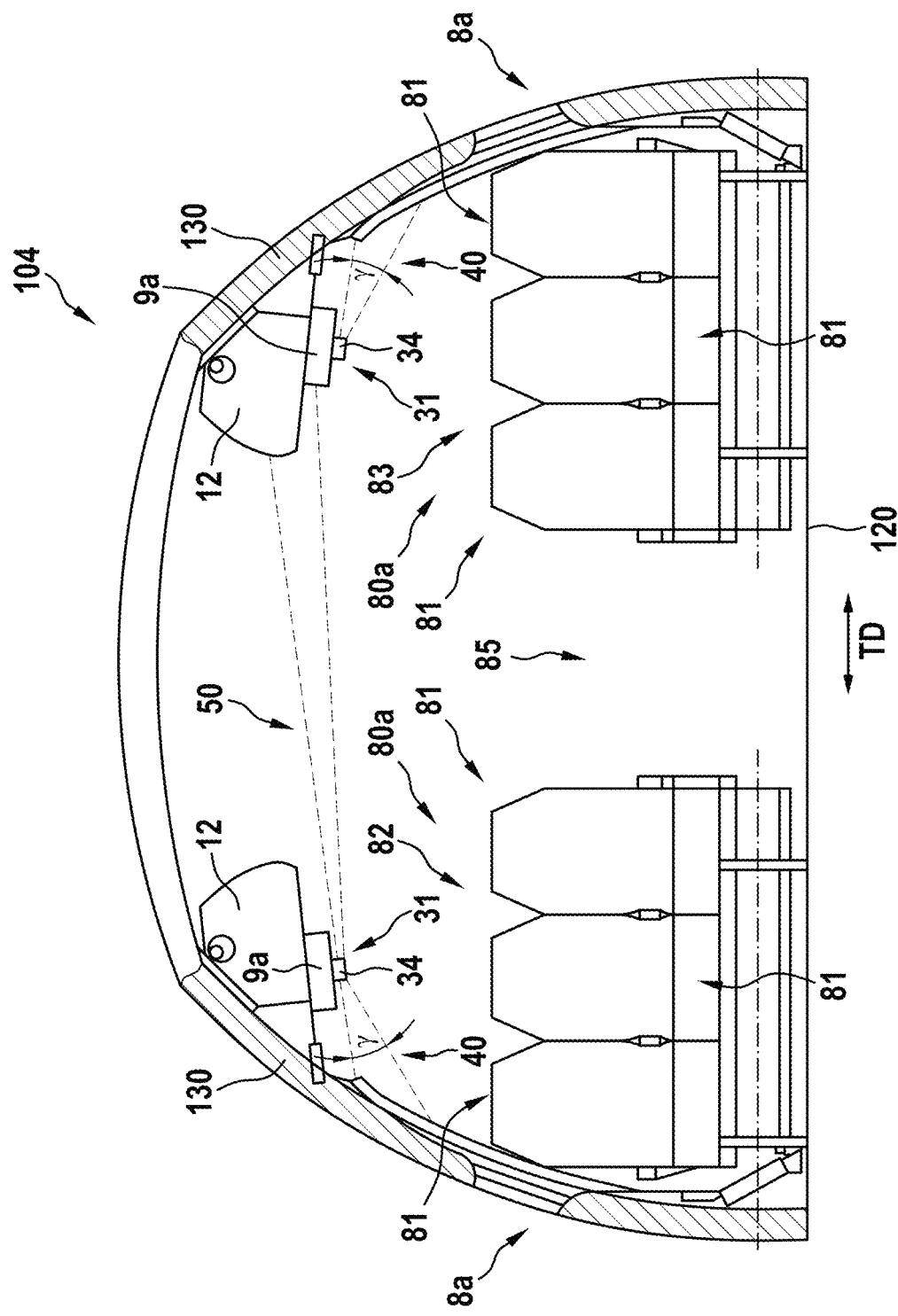
FIG. 7 depicts a cross-sectional view of the passenger cabin of the aircraft depicted in FIG. 1, wherein the cross-sectional view is oriented orthogonal to the longitudinal cross-sectional view depicted in FIG. 2.

The wall illumination light 34 comprises at least one second switchable light source 36 and a light directing element 35. The at least one second switchable light source 36 and the light directing element 35 are arranged to provide at least one wall illumination light output 40, which is emitted towards at least one lateral side of the aircraft overhead passenger service unit 9a. An exemplary wall illumination light output 40 is schematically depicted in FIG. 7, which will be discussed in more detail further below.

The at least one second switchable light source 36 may be at least one LED. The at least one first switchable light source 32 and the at least one second switchable light source 36 are switchable independently from each other, in order to allow for activating and deactivating the wall illumination light output 40 independently of displaying the signaling information.

The at least one first switchable light source 32 may include a plurality of first switchable light sources 32, and/or the at least one switchable second light source 36 may include a plurality of second switchable light sources 36.

In an embodiment comprising a plurality of first switchable light sources 32, the plurality of first switchable light sources 32 may be collectively switchable.

Alternatively, the plurality of first switchable light sources 32 may be switchable independently of each other, in order to allow for varying the illumination of the at least partially light transmissive screen 33 from behind. The plurality of first switchable light sources 32 may in particular be arranged for illuminating different portions of the at least partially light transmissive screen 33. This may allow for displaying different signaling symbols and/or alphanumeric messages on the at least partially light transmissive screen 33 by selectively activating different first switchable light sources 32. The plurality of first switchable light sources 32 may also include first switchable light sources 32 emitting light having different colors. This may allow for illuminating the at least partially light transmissive screen 33 with light having different colors by selectively activating different first switchable light sources 32.

The plurality of first switchable light sources 32 may also include several groups of first switchable light sources 32. All first switchable light sources 32 in each group of first switchable light sources 32 may be collectively switchable, and the individual groups of first switchable light sources 32 may be switchable independently of each other.

In an embodiment comprising a plurality of second switchable light sources 36, the plurality of second switchable light sources 36 may be collectively switchable.

Alternatively, the plurality of second switchable light sources 36 may be switchable independently of each other, in order to allow for varying the illumination of the cabin wall 130. The plurality of second switchable light sources 36 may include second switchable light sources 36 emitting light having different intensities and/or different colors. Individually switching the plurality of second switchable light sources 36 may allow for varying the intensity and/or the color of the illumination of the cabin wall 130, as provided by the wall illumination light 34.

The plurality of second switchable light sources 36 may also include several groups of second switchable light sources 36. All second switchable light sources 36 in each group may be collectively switchable, and the individual groups of second switchable light sources 36 may be switchable independently of each other, in order to allow for varying the intensity and/or the color of the illumination of the cabin wall 130.

The visual sign structure 31 further comprises a common support 38 that supports the at least one first switchable light source 32 and the at least one second switchable light source 36. The at least one first switchable light source 32 and the at least one second switchable light source 36 may in particular be arranged on opposite sides of the common support 38. The common support 38 may comprise a circuit board, in particular a printed circuit board, comprising electric paths for supplying electric power to the first and second switchable light source 32, 36. The at least one first switchable light source 32 may be arranged on a first side of the common support 38, in particular on a side facing in the rearward direction R, and the at least one second switchable light source 36 may be arranged on a second side of the common support 38, in particular on a side facing in the forward direction F.

The at least one first light source 32 faces in the rearward direction R, which is oriented opposite to the flight direction of the aircraft 100, and towards passengers sitting on the passenger seats 81. The passengers are not shown in the figures.

The at least one second switchable light source 36 faces in the forward direction F, which is oriented opposite to the rearward direction R and which basically coincides with the flight direction of the aircraft 100.

In the embodiment depicted in FIG. 4, the common support 38 extends straight down from the aircraft overhead passenger service unit 9a. The common support 38 may be oriented orthogonal to the longitudinal direction L of the aircraft overhead passenger service unit 9a.

Besides the at least one first switchable light source 32 and the at least one second switchable light source 36, the common support 38 may support other electronic components. For example, the common support 38 may support power circuitry for supplying the at least one first switchable light source 32 and the at least one second switchable light source 36 with electric power. As another example, the common support 38 may support a controller, which is configured to control/switch the at least one first switchable light source 32 and the at least one second switchable light source 36 in response to control commands, received from outside of the aircraft overhead passenger service unit 9a. Such additional electronic component(s) may be arranged on either side of the common support 38. In case the common support 38 is embodied as a circuit board, the additional electronic component(s) may be electrically coupled with the at least one first switchable light source, the at least one second switchable light source, and/or power data interfaces of the aircraft overhead passenger service unit 9a via according paths/conductors on the circuit board.

Figure 5:
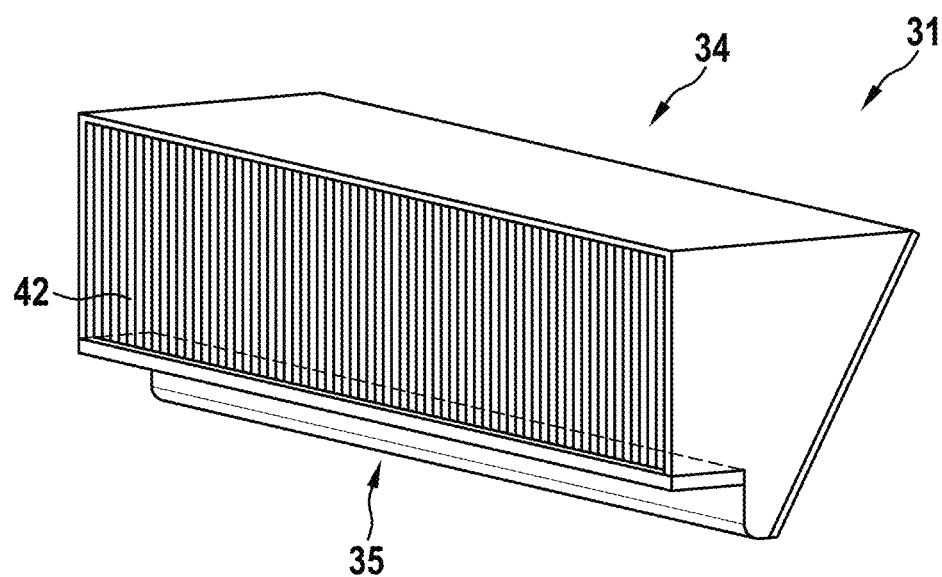
FIG. 5 depicts an exemplary embodiment of a visual sign structure, which may be employed in an overhead passenger service unit according to an exemplary embodiment of the invention, in a perspective view, the perspective view being directed to the light directing element of the wall illumination light of the visual sign structure.

A perspective view of an exemplary embodiment of a visual sign structure 31, which may be employed in an overhead aircraft passenger service unit in accordance with an exemplary embodiment of the invention, is depicted in FIG. 5. The perspective view of FIG. 5 is directed towards a light directing element 35 of a wall illumination light 34 of the visual sign structure 31.

Figure 6:
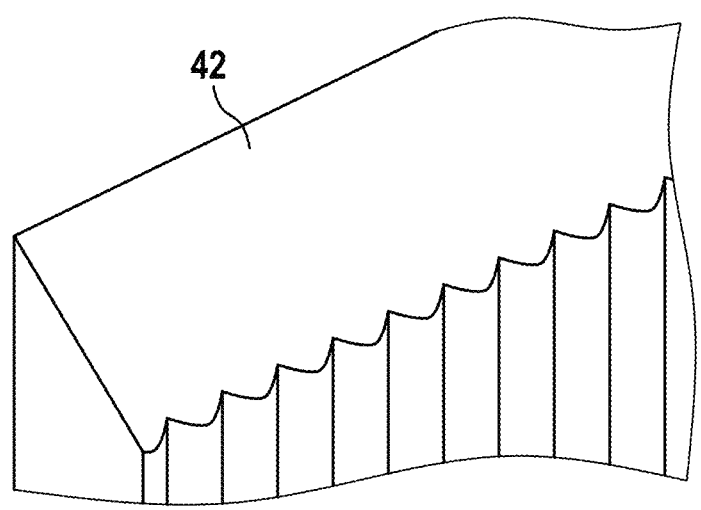
FIG. 6 depicts an enlarged portion of the light directing element depicted in FIG. 5.

The light directing element 35 depicted in FIG. 5 includes a light scattering element 42 for generating a diffuse wall illumination light output 40. An enlarged portion of the light scattering element 42 is depicted in FIG. 6. In the exemplary embodiment of FIGS. 5 and 6, the light scattering element 42 includes a corrugated light transmissive plate, having a corrugated/undulated surface on its outside, i.e. on the side of the light transmissive plate facing in the forward direction F. The light scattering element 42 may be made of a light transmissive synthetic material. The light scattering element 42 may in particular be made of polymethyl methacrylate (PMMA), polycarbonate (PC), glass, or other suitable materials.

Alternatively or additionally to the light scattering element 42, the light directing element 35 may include a light reflective element, which is not shown in the figures.

Emitting the wall illumination light output 40 towards at least one lateral side of the aircraft overhead passenger service unit 9a does not require the wall illumination light output 40 to be emitted exactly laterally, in particular orthogonal with respect to the longitudinal direction L of the aircraft overhead passenger service unit 9a.

Emitting the wall illumination light output 40 towards at least one lateral side of the aircraft overhead passenger service unit 9a may in particular include emitting the at least one wall illumination light output 40 towards at least one portion of the cabin wall 130 of the passenger cabin 104 for illuminating said at least one portion of said cabin wall 130.

Illuminating a portion of a cabin wall 130 of a passenger cabin 104 with a wall illumination light 34 of an aircraft overhead passenger service unit in accordance with an exemplary embodiment of the invention is schematically illustrated in FIG. 7. FIG. 7 depicts a cross-sectional view of the passenger cabin 104 of the aircraft 100 of FIG. 1, wherein the cross-sectional view is oriented orthogonal to the longitudinal cross-sectional view depicted in FIG. 2.

Six passenger seats 81, forming a seat row 80a, are depicted in FIG. 7. The six passenger seats 81 are arranged next to each other along a lateral direction TD of the passenger cabin 104, which is orientated orthogonal to the longitudinal direction LD of the passenger cabin 104. The six passenger seats 81 are arranged in two groups 82, 83 of passenger seats 81. Each group 82, 83 of passenger seats 81 comprises three passenger seats 81. The two groups 82, 83 of passenger seats 81 are separated by a central aisle 85, which extends between the two groups 82, 83 of passenger seats 81 along the longitudinal direction LD of the passenger cabin 104.

An overhead baggage compartment 12 and an aircraft overhead passenger service unit 9a are arranged above each group 82, 83 of passenger seats 81, respectively. Each aircraft overhead passenger service unit 9a comprises a visual sign structure 31, as described above, including a wall illumination light 34 for emitting a wall illumination light output 40 towards a portion of a cabin wall 130 of the passenger cabin 104.

The wall illumination light output 40 may be oriented slightly downwards, as it is depicted in FIG. 7, for illuminating a portion of the cabin wall 130 that is arranged at a lower height than the aircraft overhead passenger service unit 9a.

The wall illumination light output 40 may have varying intensities in different spatial directions. The varying intensities may include a maximum intensity. An opening angle of the wall illumination light output 40 may be defined as an angular range in which the intensity of the wall illumination light output 40 is at least 10% of the maximum intensity of the wall illumination light output 40.

When projected onto a horizontal plane, which may extend parallel to the lower surface 10 of the aircraft overhead passenger service unit 9a, a horizontal opening angle of the wall illumination light output 40 may be in a range of between 90° and 180°, in particular in a range of between 120° and 150°, around a transverse direction of the aircraft overhead passenger service unit 9a. The transverse direction may be oriented orthogonal to the longitudinal direction L of the aircraft overhead passenger service unit 9a.

When projected onto a vertical plane, which extends orthogonal to the floor 120 of the passenger cabin 104 and orthogonal to the longitudinal direction LD of the passenger cabin 104, a vertical opening angle γ of the wall illumination light output 40 may be in a range of between 20° and 70°, in particular in a range of between 30° and 60°.

The wall illumination light 34 may be configured for providing a single wall illumination light output 40, which is emitted towards a single lateral side of the aircraft overhead passenger service unit 9*a*.

For generating the desired wall illumination light output 40, the light directing element 35 of the wall illumination light 34 may comprise two possible mounting orientations. Each of the two possible mounting orientations may be associated with a respective single lateral side, to which the wall illumination light output 40 is directed. In other words, depending on the mounting orientation of its light directing element 35, the wall illumination light 34 may selectively emit the wall illumination light output 40 to its left side or to its right side, when viewed in the forward direction F.

Employing a light directing element 35 having two possible mounting orientations allows for using the same wall illumination light 34 for selectively emitting the wall illumination light output 40 to the left side or to the right side of the aircraft overhead passenger service unit 9*a*. The side, to which the wall illumination light output 40 is emitted, may be selected by choosing the mounting orientation of the light directing element 35. As a result, it is not necessary to provide two different types of aircraft overhead passenger service units 9 for selectively illuminating the left cabin wall or the right cabin wall. In consequence, the costs for manufacturing the aircraft overhead passenger service units 9 and the assembly complexity may be reduced.

In a further embodiment, the at least one second switchable light source 36 and the light directing element 35 of the wall illumination light 34 may be configured to provide two wall illumination light outputs 40. The two wall illumination light outputs 40 may be directed towards two lateral sides of the aircraft overhead passenger service unit 9*a*. The two wall illumination light outputs 40 may be directed predominantly towards two different lateral sides, in particular towards two opposing lateral sides, for example for illuminating two opposing cabin walls 130. The two opposing lateral sides may be oriented at an angle of approximately 180° with respect to each other. The two opposing lateral sides may in particular be oriented at an angle, which is in the range of 160° to 180°, with respect to each other. Depending on the set-up of the passenger cabin 104, the two wall illumination light outputs 40 may illuminate two opposing walls. It is also possible that one of the two wall illumination light outputs 40 illuminates a cabin wall, while the other one of the two wall illumination light outputs 40 contributes to the general cabin illumination. It is possible that the two wall illumination light outputs 40 are substantially symmetrical with respect to the longitudinal direction L of the aircraft overhead passenger service unit 9*a*. In this case, it may also be possible to equip the aircraft with one type of aircraft overhead passenger service units only.

In a further embodiment, which is schematically depicted in FIG. 7, the at least one second switchable light source 36 and the light directing element 35 of the wall illumination light 34 may be configured to provide two wall illumination light outputs 40, 50 that are not symmetrical with respect to the longitudinal direction L of the aircraft overhead passenger service unit 9*a*. In particular, the first wall illumination light output 40 may be directed to illuminate a first cabin wall 130 of the passenger cabin 104, which is located next to the respective aircraft overhead passenger service unit 9*a*, and the second wall illumination light output 50 may be directed to illuminate one or more overhead baggage compartments 12, arranged on the other side of the passenger cabin 104.

For reasons of clarity, the second wall illumination light output 50, which may be emitted by the wall illumination light 34 located on the right side of the passenger cabin 104 in the drawing plane of FIG. 7, is not shown in FIG. 7.

While the invention has been described with reference to exemplary embodiments, it will be understood by those skilled in the art that various changes may be made and equivalents May be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft overhead passenger service unit, configured to be mounted in a passenger cabin of an aircraft above a passenger seating space, the aircraft overhead passenger service unit comprising:
   a visual sign structure extending downward from a lower surface of the aircraft overhead passenger service unit, the visual sign structure comprising:
   a signal light, the signal light being arranged on a first side of the visual sign structure facing rearward of the aircraft, wherein the signal light comprises at least one first switchable light source;
   a wall illumination light, the wall illumination light being arranged on a second side of the visual sign structure facing forward of the aircraft, wherein the wall illumination light comprises at least one second switchable light source and a light directing element, with the at least one second switchable light source and the light directing element being arranged to provide a wall illumination light output towards a lateral side of the aircraft overhead passenger service unit.

2. The aircraft overhead passenger service unit according to claim 1, wherein the signal light comprises an at least partially light transmissive screen, arranged over the at least one first switchable light source,
   wherein the at least partially light transmissive screen is configured to convey signaling information when back-lit by the at least one first switchable light source,
   wherein the signaling information in particular comprises at least one signaling symbol and/or at least one alphanumeric message.

3. The aircraft overhead passenger service unit to claim 1, wherein the wall illumination light output has a horizontal opening angle in a range of between 90° and 180°, in particular in a range of between 120° and 150°, around a transverse direction, which is orthogonal to a longitudinal direction of the aircraft overhead passenger service unit.

4. The aircraft overhead passenger service unit according to claim 1, wherein the wall illumination light output has a vertical opening angle ($\gamma$) in a range of between 20° and 70°, in particular in a range of between 30° to 60°.

5. The aircraft overhead passenger service unit according to claim 1, wherein the visual sign structure comprises a common support that supports the at least one first switchable light source and the at least one second switchable light source, wherein the at least one first switchable light source and the at least one second switchable light source are arranged on opposite sides of the common support.

6. The aircraft overhead passenger service unit according to claim 5, wherein the common support comprises a circuit board, in particular a printed circuit board.

7. The aircraft overhead passenger service unit according to claim 5, wherein the common support extends straight down from the aircraft overhead passenger service unit, with the at least one second switchable light source facing forward and the at least one first light source facing rearward.

8. The aircraft overhead passenger service unit according to claim 1, wherein the light directing element of the wall illumination light includes a light scattering element, wherein the light scattering element in particular includes a corrugated light transmissive plate.

9. The aircraft overhead passenger service unit according to claim 1, wherein the at least one first switchable light source is a plurality of first switchable light sources and/or wherein the at least one switchable second light source is a plurality of second switchable light sources.

10. The overhead passenger service unit according to claim 1, wherein the at least one second switchable light source and the light directing element of the wall illumination light are configured to provide a single wall illumination light output towards a single lateral side of the aircraft overhead passenger service unit.

11. The aircraft overhead passenger service unit according to claim 10, wherein the light directing element has two possible mounting orientations, wherein each of the two possible mounting orientations is associated with a respective single lateral side of the aircraft overhead passenger service unit, to which the single wall illumination light output is directed, when the light directing element is mounted in the respective mounting orientation.

12. The aircraft overhead passenger service unit according to claim 1, wherein the at least one second switchable light source and the light directing element of the wall illumination light are configured to provide two wall illumination light outputs towards two lateral sides of the aircraft overhead passenger service unit.

13. An aircraft, such as an airplane or a helicopter, comprising:
  a passenger cabin; and
  at least one aircraft overhead passenger service unit according to claim 1;
  wherein the at least one aircraft overhead passenger service unit is mounted to a passenger overhead portion of the passenger cabin, with the wall illumination light output of the wall illumination light being directed towards a cabin wall of the passenger cabin.

14. The aircraft according to claim 13, wherein the at least one aircraft overhead passenger service unit is a plurality of aircraft overhead passenger service units, and wherein the plurality of aircraft overhead passenger service units are arranged in one or more row arrangements along one or more passenger supply channels in the passenger overhead portion of the passenger cabin.

15. A method of illuminating a passenger cabin of an aircraft from a visual sign structure that extends downward from a lower surface of an aircraft overhead passenger service unit, which is mounted to a passenger overhead portion of the passenger cabin, the method comprising:
  from a first side of the visual sign structure facing rearward of the aircraft, selectively providing a signal light output; and
  from a second side of the visual sign structure facing forward of the aircraft, selectively providing a wall illumination light output towards a lateral side of the aircraft overhead passenger service unit, with the wall illumination light output being directed towards a cabin wall of the passenger cabin.

* * * * *